United States Patent Office 2,978,923
Patented Apr. 11, 1961

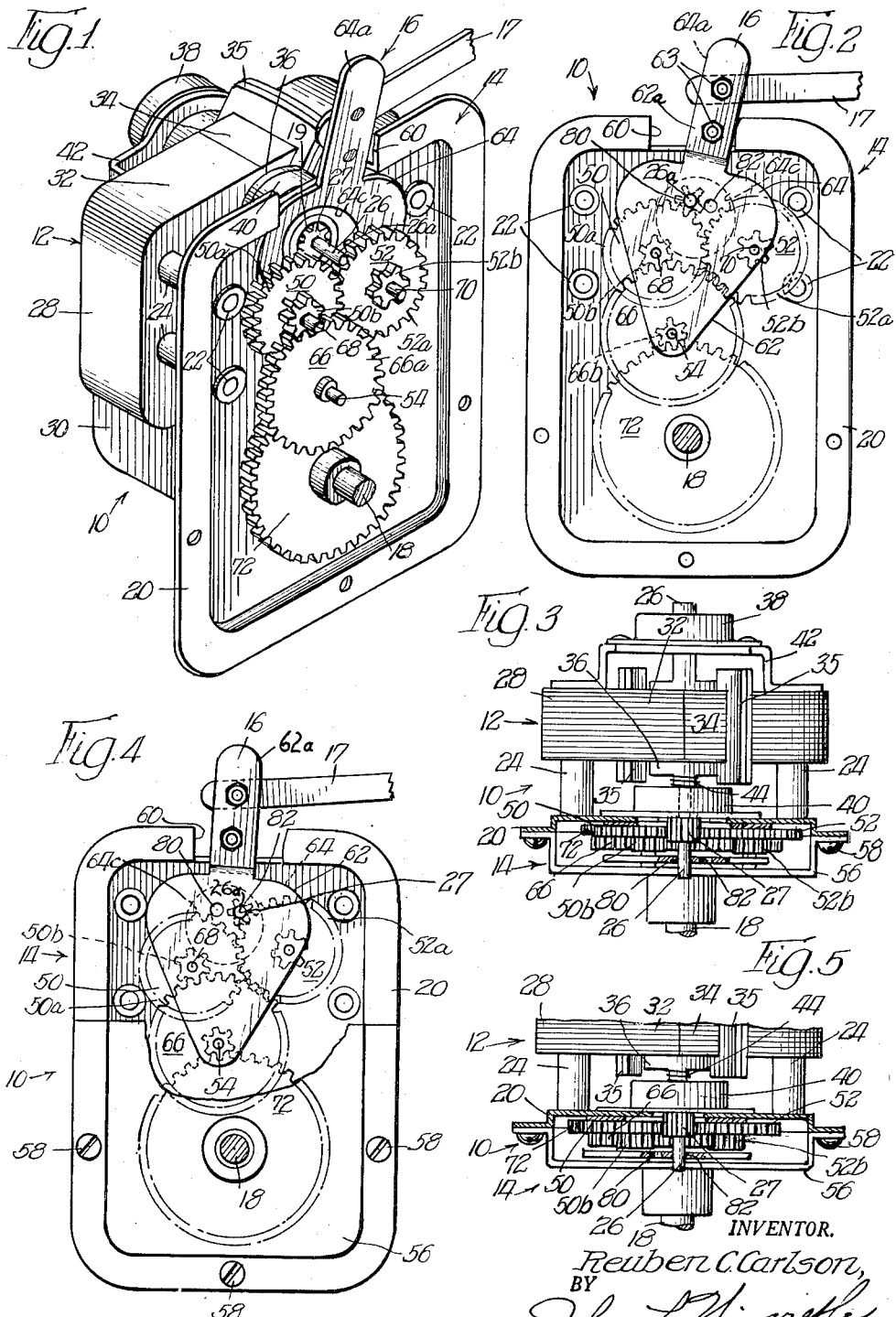

2,978,923
BI-DIRECTIONAL TRANSMISSION AND MOTOR SYSTEM

Reuben C. Carlson, Bensenville, Ill., assignor to Admiral Corporation, Chicago, Ill., a corporation of Delaware Filed Apr. 15, 1959, Ser. No. 806,547

10 Claims. (Cl. 74—472)

The present invention relates to a bi-directional motive system, and more particularly, relates to a motor system having bi-directional output movement developed from a unidirectional movement of a unidirectional motor.

It is an object of the present invention to provide a new and improved motor system characterized by producing bi-directional or reversible movement from a motor having unidirectional movement.

It is another object of the present invention to provide a new and improved bi-directional motor system which can be set for predetermined directional movement prior to its operation.

It is a further object of the present invention in accordance with the previous object to maintain a preselected drive connection through the system for providing the predetermined directional movement even though a second directional movement is called for during operation of the system.

Still another object of the present invention is to provide a new and improved bi-directional motor system wherein a gearing mechanism embodied in the system is interlocked to the output driving means of a unidirectional motor during operation of the system to assure a positive drive connection through the system.

It is another object of the present invention to provide a new and improved bi-directional motor system which is relatively compact and rugged, is easily manufactured and transported, and is relatively inexpensive.

The above and other objects are achieved in accordance with the present invention by providing a new and improved motor system adapted to develop a bi-directional movement from a motor having only unidirectional movement. Briefly, the system comprises a gearing mechanism having first and second input means adapted selectively to be drivingly coupled to driving means of a unidirectional motor means. The gearing mechanism further includes a direction selector which is adapted to be pre-set prior to the operation of the unidirectional motor means for the purpose of locating one of the gearing input means in an operative position to establish a preselected driving connection through the gearing mechanism. In an aspect of the present invention, each gearing input means in its operative position is drivingly coupled to the motor driving means incident to relative movement between the motor driving means and the gearing means, thereby to produce a desired directional output movement. In another aspect of the present invention, the driving connection between the motor means and the gearing mechanism is uninterrupted or positively maintained during operation of the motor means, thereby assuring that the motor system will produce the desired directional movement. In this connection, the motor input driving means and the gearing means are interlocked when the motor means is operative and the gearing means are in their operative positions to prevent the interruption of the driving connection, even though the direction selector calls for another directional movement during operation of the system.

The invention, both as to its organization and method of operation, taken with further objects and advantages thereof, will best be understood by reference to the following description taken in connection with the accompanying drawings, in which:

Figure 1 is a fragmentary isometric view of a motor system embodying the features of the present invention, illustrating the system in an inoperative condition;

Figure 2 is a fragmentary front elevational view of the motor system of Figure 1, illustrating the system in one of its operative positions to produce a first unidirectional output movement;

Figure 3 is a top plan view of the system of Figure 2, shown partially in section;

Figure 4 is a fragmentary front elevational view of the motor system of Figure 1, illustrating the system in another one of its operative positions to produce a second unidirectional output movement; and Figure 5 is a fragmentary top plan view of the system of Figure 4, shown partially in section.

Referring now to the drawings and more particularly to Figure 1 thereof, a motor system embodying the principles of the present invention is illustrated and is generally identified by reference numeral 10. The motor system 10 is of the bi-directional type and is operable to produce a constant speed output, irrespective of the direction of movement of its output. Briefly, the motor system 10 comprises a unidirectional motor 12 energized by an electrical source under the control of suitable control means (not shown) and a gearing mechanism 14 adapted to be drivingly connected to the unidirectional motor 12 to transform the unidirectional movement of the motor 12 into a bi-directional movement. The gearing mechanism 14 includes a direction selector 16 which is moved into operative positions under the control of an actuator means 17 illustrated fragmentarily in the drawing. The actuator means 17 is operable prior to the operation of the motor 12 to pre-set the selector 16 to produce a desired directional movement of an output shaft 18 of the gearing mechanism 14.

Considering now the structural details of the motor system 10, the unidirectional motor 12 and the gearing mechanism 14 are fixedly supported from opposite sides of the casing 20 as viewed in Figure 1. The core of the motor 12 is seated on a plurality of spaced apart sleeve supports 24 and is thus spaced from the upper left end of the casing 20. The sleeve supports respectively accommodate fasteners 22 which extend through openings (not shown) defined in the motor core and the casing 20, the heads of the fasteners being seated against the core and the ends of the fasteners being peened over the casing thereby to fixedly secure the motor 12 to the casing. As shown in Figure 1, an aperture 19 is provided adjacent the upper end of the casing 20 to permit mechanical interconnection between the motor 12 and the gearing means supported from the right side of the casing 20.

The electric motor 12 comprises a conventional A.C., squirrel-cage type motor which is energized by the control means (not shown) to effect clockwise rotation of the motor output driving means, generally identified as 26. The output driving means or shaft 26 extends through and is axially movable in the aperture 19 of the casing 20, as described in detail hereinafter, and includes an output pinion driving gear 27 which is adapted to drivingly engage the gearing mechanism 14. More specifically, the motor 12 includes a U-shaped, laminated core 28 having a control winding 30 wound about its bight portion. At the upper ends of the arms of the core 28, a pair of opposing pole pieces 32 and 34 extend toward one another to provide a generally closed magnetic circuit for the flux generated by the control winding 30. The pole pieces 32 and 34 have semi-cylindrical opposing surfaces to define a generally cylindrical opening which is slightly oversized to accommodate a rotor 36. The rotor 36 is fixedly mounted on the driving shaft 26 which is rotatably supported from a pair of spaced apart bearing assemblies 38 and 40, respectively, secured to a bracket 42 attached to the core 28 and to the casing 20. A pair of electrically conductive, short circuited, shading windings or coils 35 are supported by the pole pieces 32 and 34 adjacent to the rotor 36 to provide a self starting means for the motor 12 incident to energization of its control winding 28.

In addition to the rotor 36 being rotatably supported by the output shaft 26 from the bearing assemblies 38 and 40, the rotor 36 is also supported from the bearing assemblies 38 and 40 for axial movement therewith. Accordingly, the output shaft 26 is axially movable in said bearing assemblies 38 and 40, and, in fact, extends entirely through the assemblies, as best seen at Figure 3. Specifically, the rotor 36 is located between the bearing assemblies 38 and 40 and is axially movable from an inoperative position, illustrated in Figure 1, to an operative position illustrated in Figures 2, 3, 4 and 5 when the motor 12 is energized. When the system 10 is inoperative and the motor 12 is deenergized, the rotor 36 is maintained in its inoperative position by a coiled spring 44 wound around the output shaft 26. The spring 44 is located between the rotor 36 and the bearing assembly 40, as clearly illustrated in Figures 3 and 5, and urges the rotor 36 to the rear of the system 10 so that it is partially displaced rearwardly of the pole pieces 32 and 34. On the other hand, when the system 10 is operative and the motor control winding 30 is energized, the rotor 36 is drawn into the magnetic field developed by the control winding 30 and extends across the pole pieces 32 and 34 to assume a position centrally of the pole pieces 32 and 34 as shown best in Figures 3 and 5. This result occurs because of the basic electromagnetic principle that a magnetic member will seek a position in a magnetic field that produces a minimum air gap for the flux lines in the magnetic field, thereby to decrease the reluctance of the magnetic circuit and, hence, increase the flux strength. By the above construction, as the motor 12 is energized and deenergized, the rotor 36 moves between its operative and inoperative positions and therefore the output driving shaft and hence the output driving gear 27 is moved forwardly and rearwardly through the aperture 19 of the casing 20.

It will be appreciated that instead of correlating the axial movement of the pinion gear 27 to the energization of the motor 12, any suitable means may be provided to obtain relative movement between the pinion gear 27 and the gearing mechanism 14. For example, a suitable solenoid or the like mechanism may be used to axially move the output driving shaft 26 and the pinion gear 27 independently of the motor 12. In this respect a motor having a rotor 36 which is not axially movable could be used to drive a solenoid controlled gear mechanism which, when operated, would axially move a pinion gear, similar to pinion gear 27, into an operative position. Thus, the motor could be selectively energized and deenergized without causing driving engagement of the pinion gear with the gearing mechanism. A similar arrangement being shown in the co-pending application of the same inventor as herein, Serial Number 19,716, filed April 4, 1960. The subject matter of application Serial Number 19,716 being directed to multiple stators and rotors in various combinations, and to an extent relates to similar subject matter as the present invention. It should be further understood that selective driving connection between the pinion gear 27 and the gearing mechanism 14 can also be obtained by moving the pinion gear 27 in a non-axial manner between an inoperative position in non-driving engagement with the gearing mechanism 14 and an operative position in driving engagement with the gearing mechanism 14. A similar arrangement being shown in the co-pending application of the same inventor as herein, Serial Number 6,177, filed February 2, 1960. Furthermore, the above described driving connection can also be obtained by moving the gearing mechanism 14 relative to the pinion gear 27, instead of moving the pinion gear 27 relative to the gearing mechanism 14. These means of obtaining relative movement between the gear 27 and the gearing mechanism 14 are merely representative of obvious mechanical equivalents to the preferred embodiment, shown in the drawings, and which utilizes the energization of the motor 12 to effect the required relative movement. A similar arrangement being shown in the co-pending application of the same inventor as herein, Serial Number 820,468, filed June 15, 1959.

Considering now the gearing mechanism 14 in greater detail, it includes a direction selector 16 pivotally supported from the casing 20 and a plurality of meshing gears comprising a gear train interconnecting the pinion gear 27 and the output shaft 18 of the system. As previously mentioned, the selector 16 is controlled by an actuator means 17 to cause the output shaft 18 of the motor system 10 to selectively rotate in a clockwise or counterclockwise direction as seen in Figure 1. With the selector 16 in the operative position illustrated in Figures 2 and 3, the axially movable pinion gear 27 is movable under the control of the motor 12 into driving engagement with a first input gear 50 to cause rotation of the output shaft 18 in a counterclockwise direction, but with the selector 16 in the operative position illustrated in Figures 4 and 5, the pinion gear 27 is movable under the control of the motor 12 into driving engagement with a second input gear 52 to cause rotation of the output shaft 18 in a clockwise direction. Thus, prior to operation of the motor 12, the selector 16 is operated by the actuator means 17 to condition the system to produce the desired output directional movement. In its operative position, the selector 16 pre-sets the gearing mechanism so that incident to driving engagement of the pinion gear 27 with the gearing mechanism 14, a predetermined driving connection is obtained from the motor 12 to the output shaft 18.

In accordance with an aspect of the present invention, a portion of the gearing mechanism 14 including the input gears 50, 52, is mounted to the selector 16 and, in order to move the input gears 50 and 52 alternately into their operative position shown in Figures 2 and 3 and Figures 4 and 5, the selector 16 is pivotally mounted adjacent its lower end to a gear shaft 54. The ends of the gear shaft 54 are journaled respectively in the casing 20 and in a dish-shaped casing plate 56 which is fixedly secured by fasteners 58 to the lower portion of the casing 20 as best illustrated in Figures 3, 4 and 5. By this construction, the selector 16 is disposed between the casing 20 and the casing plate 56 so that its upper extension extends upwardly through a cut-away portion 60 at the upper end of the casing 20. The selector 16 specifically includes a pair of spaced apart support levers 62 and 64 between which are supported a portion of the gear mechanism 14. The support levers have generally inverted triangular body portions pivotally mounted to the gear shaft 54, the lower ends of the levers being respectively adjacent to the casing plate 56 and the casing 20. To maintain the support levers 62 and 64 in spaced apart, generally parallel, relation, an idler spur-pinion gear 66 is mounted on the shaft 54 between the lower ends of the levers 62 and 64 while an upper extension 62a of the support lever 62 is angulated so that its extreme end abuts against the generally flat, upper extension 64a of the lever 64, the extensions 62a and 64a being secured together by suitable fasteners 63. As shown in Figures 1, 2 and 4, an opening 64c is provided in the support lever 64 to accommodate the axially movable driving shaft 26 and associated pinion gear 27 and is greatly oversized to permit the selector 16 to be moved between its operative position without engaging either the shaft 26 or the pinion gear 27.

Considering now the gear train of the gearing mechanism 14 in greater detail and referring to Figures 2 and 4, the above-mentioned input gears 50 and 52 comprise spur-pinion gears and are mounted on shafts 68 and 70, respectively, which are journaled in the support levers 62 and 64. The shafts 68 and 70 are so spaced apart that the spur gears 50a and the spur gear 52a are in continual driving engagement. Furthermore, the spacing of the shafts 68 and 70 are such that, when the selector 16 is located in its operative positions, either the spur gear 50a or the spur gear 52a is positioned to be drivingly engaged by the axially movable pinion gear 27. Since the input gears 50 and 52 are in driving engagement, it will be appreciated that both of the input gears 50 and 52 rotate when the driving pinion 27 is in engagement with either one of the spur gears 50a or 52a. However, since the driving pinion 27 rotates in a clockwise direction, it rotates the input gear 50 in a counterclockwise direction when in driving engagement with the input gear 50 while it rotates the gear 50 in a clockwise direction when in driving engagement with the input gear 52. Accordingly, the pinion gear 50b of the input gear 50 rotates in either a clockwise or counterclockwise direction depending upon the operative position of the selector 16 and thus, controls the direction of rotation of the gear train and the output shaft 18. Irrespective of whether the pinion gear 27 drivingly engages the input gear 50 or the input gear 52, the spur pinion gear 50a is directly mechanically connected through the gear train to the output shaft 18. More specifically, the pinion gear is drivingly connected to a spur gear 66a of an idler spur pinion gear 66, which as previously described is mounted on the gear shaft 54, a pinion gear 66b (see Figures 2 and 4) and a spur gear 72 which is fixedly secured to the output shaft 18. Accordingly, if the pinion gear 27 meshes with the input gear 50, the spur gear 50a rotates in a counterclockwise direction, with the result that the output shaft 18 is rotatably driven by the above described gear train in a counterclockwise direction, while if the pinion gear 27 meshes with the input gear 52, the spur gear 52a rotates in a counterclockwise direction and the spur gear 50a rotates in a clockwise direction, with the result that the output shaft is rotatably driven by the gear train in a clockwise direction.

From the foregoing description, it should be understood that when the motor system 10 is inoperative, the rotor 36 is urged into its inoperative position, i.e., rearwardly displaced from the pole pieces 32 and 34, under the control of the coil spring 44 and is at rest or in a nonrotating condition. While the motor system is inoperative, the directional selector 16 of the gearing mechanism 14 is actuable by the actuator means 17 into either of its operative positions, i.e., into its operative position illustrated in Figures 2-3 or its operative position illustrated in Figures 4-5 to obtain a desired directional movement of the output shaft 18. However, if the selector 16 is moved to a position intermediate the above described operative positions, no driving engagement is effected between the pinion gear 27 and either of the input gears 50 and 52.

In operation, if counterclockwise rotation of the shaft 18 is desired, the selector 16 is moved into position by the actuating means 17, i.e., the position illustrated in Figures 2-3, and the motor 12 is energized by the control means (not shown). The rotor simultaneously rotates in a clockwise direction and moves axially from the position shown in Figure 1 to the position shown in Figures 2, 3, 4 and 5, whereby the pinion gear 27 rotates in a clockwise direction and moves axially into driving engagement with the input gear 50. The drive connection through the gearing mechanism 14 is as follows: the spur gear 50a, the pinion gear 50b, the spur gear 66a, the pinion gear 66b, the spur gear 72, and the output driving shaft 18. With the above described connection, the output shaft 18 rotates in a counterclockwise direction at a constant speed determined by the rated speed of the motor 12 and the gear reduction of the gearing mechanism 14.

In accordance with an aspect of the present invention, the pinion driving gear 27 is maintained in driving engagement with the input gear 50 by cooperative interlocking means embodied in the output driving shaft 26 and the gearing mechanism 14. More specifically, the cooperative interlocking means function to drivingly lock the pinion gear 27 and the input gear 50 together during operation of the motor 12 and further serve to override the effect of the actuator means 17 which may be operated during operation of the motor 12 in an attempt to move the selector 16 out of the position illustrated in Figures 2-3. To this end, the support 62 of the selector is provided with a relatively small opening 80 (see Figures 2-4) for accommodating an extension 26a of the motor output shaft 26. The extension 26a extends beyond the pinion gear 27 to be insertable through the opening 80 incident to axial movement of the rotor 36. The extension 26a has a generally conical head while the diameter of the opening 80 is slightly oversized to facilitate mating of the output shaft 26 and the selector 16. Thus, with the motor 12 operative, the extension 26a coacts with the opening structure 80 to prevent movement of the selector 16 and hence relative movement between the gears 27 and 50. Accordingly, the axial center lines of the gears 27 and 50 are maintained in fixed, spaced relationship, even though the actuator 17 is operated.

To render the motor system inoperative, the motor 12 is deenergized by the control means (not shown) with the result that the magnetic field developed across the pole pieces 32 and 34 collapses and the rotor 36 axially returns under the control of the coil spring 44 to its inoperative position, partially displaced rearwardly from the pole pieces 32 and 34. Accordingly, the output shaft 26 and the pinion gear 27 move axially into the position as illustrated in Figure 1, whereby the shaft extension 26a is withdrawn from the opening 80, thereby unlocking the selector 16 from the motor output shaft and permitting the selector 16 to be moved under the control of the actuator means 17 into another position.

If clockwise rotation of the output shaft 18 is desired and assuming that the system 10 is inoperative, the selector 16 is moved by the actuator means 17 from the position illustrated in Figures 2-3 to the position illustrated in Figures 4-5. During this movement of the selector 16, the gears 50, 52 and 66 are moved to the left as viewed in Figures 2 and 4, whereby the gear 50 moves away from its operative position and the gear 52 moves into its operative position to be driven by the pinion gear 27. The motor system 10 is turned on by energizing the motor 12 with the result, as previously described, the pinion gear 27 and the output shaft 26 axially move into driving engagement with the input gear 52. The driving connection through the gearing mechanism 14 is as follows: the spur gears 52a, the spur gear 50a, the pinion gear 50b, the spur gear 66a, the pinion gear 66b, the spur gear 72, and the output driving shaft 18. With the spur gear 50a being rotated indirectly by the pinion gear 27 through the spur gear 52a instead of being rotated directly by the pinion gear 27, the spur gear 50a rotates in a direction opposite to that when it is directly driven by the pinion gear 27; accordingly, with the above described driving connection, the output shaft is, in fact, rotated in a clockwise direction.

In order to prevent disengagement of the pinion gear 27 and the input gear 52 during operation of the motor 12, the pinion gears 27 and the input gear 52 are maintained in fixed, spaced apart relation by a cooperative interlocking means embodied in the input driving shaft 26 and the gearing mechanism 14. Specifically, the interlocking means comprise the above described shaft extension 26a which is insertable through an opening 82 defined in the support lever 62 of the selector 16 and spaced from the previously described opening 80. The opening 82 is of the same diameter as the opening 80 and lies on an arc drawn from the pivot point of the selector 16, i.e., the gear shaft 54. In the same manner as described above, the shaft extension 26a and the opening structure 82 coact to maintain the gears 27 and 52 on fixed, spaced apart axial center lines and to prevent the selector 16 from being moved during operation of the motor even though the actuator means 17 urges the selector 16 into another position.

It will be appreciated that when the motor system 10 is inoperative, the shaft 26 is axially displaced rearwardly of the support 62 so that the shaft extension 26a is spaced from the openings 80 and 82. Therefore, the movement of the selector 16 is unobstructed and the actuating means 17 is operative to move the selector 16 into and between its operative positions.

Although it is preferable that the motor 12 be energized after the selector 16 has been preset, the motor 12 may be energized simultaneously with the actuation of the selector 16. However, since during movement of the selector the extension 26a is not in registry with either of the openings 80 and 82, the axially movable extension 26a abuts against the rear surface of the support lever 62, thereby preventing the pinion gear 27 from meshing with either of the input gears 50, 52. However, as soon as the selector 16 reaches either of its operative positions, the shaft extension 26a registers with either of the openings 80 and 82, whereby the extension 26a enters the aligned opening to permit the pinion gear 27 to drivingly engage the respective input gear.

While an embodiment described herein is at present considered to be preferred, it is understood that various modifications and improvements may be made therein, and it is intended to cover in the appended claims all such modifications and improvements as fall within the true spirit and scope of the invention.

What is claimed is:

1. A bi-directional motor system comprising a casing, a unidirectional motor means including an axially movable output driving means, means operable to move said output driving means between a first inoperative position and a second operative position, gearing means movably mounted upon said casing and including a first and second input driving means and an output driving means, said gearing means being movable into a first operative position wherein said first input driving means is in driving engagement with said axially movable driving means when in its operative position to drive the gearing output driving means in a first direction and also being movable into a second position wherein said second input driving means is in driving engagement with said axially movable driving means when in its operative position to drive the gearing output driving means in a second direction.

2. A bi-directional motor system comprising a unidirectional motor means including an output driving means, gearing means movable between first and second operative positions and including an output means, said output driving means being adapted to drive a first portion of said gearing means when in its first operative position to drive said gearing output means in a first direction and being adapted to drive a second portion of said gearing means when in its second operative position to drive said gearing output means in a second direction, and cooperative interlocking means included in said output driving means and gearing means for assuring that driving engagement is maintained between said output driving means and said gearing means when said gearing means is in one of its operative positions.

3. The system of claim 2 wherein said cooperative interlocking means includes an extension supported from said output driving means and extension receiving means provided in said gearing means for accommodating said extension, said extension coacting with said extension receiving means when said gearing means are in their operative positions to prevent relative movement between said output driving means and said gearing means.

4. The system of claim 2 wherein there is additionally provided a control means for moving said gearing means between its operative positions, said interlocking means being effective when said gearing means are in one of its operative positions to override the action of said control means.

5. The system of claim 1 wherein said axially movable driving means and said gearing means include cooperative interlocking means for maintaining said driving means in driving engagement with said first and second input driving means when in their operative positions.

6. A bi-directional motor system comprising a casing, a unidirectional motor means including an output driving means, means responsive to operation of said motor means to move said output driving means from an inoperative position to an operative position, support means pivotally supported from said casing and movable between a first and second operative position, and gearing means partially supported by said support means and including a first and second input gear means and an output means, said first input gear means being in driving engagement with said output driving means when the motor means is operative and the support means is in its first operative position to drive said gearing output means in a first direction and said second input gear means being in driving engagement with said output driving means when the motor means is operative and the support means is in its second operative position to drive said gearing output means in a second direction.

7. The system of claim 6 wherein said output driving means and said support means include cooperative interlocking means for interlocking said driving means and said input gear means to assure a driving connection between said motor means and said output means when said support means is in one of its operative positions.

8. The system of claim 6 wherein said output driving means is axially movable and includes an extension, and wherein said support means includes spaced apart receiving means for accommodating said extension when said support means is in its first and second operative positions to maintain said output driving means in driving engagement with a selected one of said input gear means.

9. A bi-directional motor system comprising a casing, a unidirectional motor means including an axially movable output driving means, means operable to move said output driving means between a first inoperative position and a second operative position, support means movably supported from said casing, gearing means movably mounted upon said support means and including a first and second input driving means and an output driving means, said support means being movable into a first position wherein said first input driving means is in driving engagement with said axially movable driving means when in its operative position to drive the gearing output driving means in a first direction, and also being movable into a second position wherein said second input driving means is in driving engagement with said axially movable driving means when in its operative position to drive the gearing output driving means in a second direction, means for moving said support means between said first and second positions, and cooperative interlocking means on said output driving means and said support means for maintaining said output driving means drivingly connected with one of said input driving means, said cooperative interlocking means overriding the operation of said moving means.

10. A bi-directional motive system for a uni-directional motive means including an output driving means, comprising means operable to render effective said output driving means, and gearing means movable between first and second operative positions and including an output means, said output driving means when rendered effective being in driving engagement with said gearing means in a first operative position to drive said gearing output means in a first direction and said gearing means when rendered effective being in driving engagement with said gearing means in a second operative position to drive said gearing output means in a second direction, said output driving means axially movable between an inoperative position and said operative positions, said gearing means movable between said first and second operative positions and including a movable support means having spaced extension receiving means, said output driving means including an extension operable when said output driving means is rendered effective to cooperate with said extension receiving means when said movable support means is in one of said operative positions.

References Cited in the file of this patent

UNITED STATES PATENTS

| | | |
|---|---|---|
| 503,420 | Johnston et al. | Aug. 15, 1893 |
| 1,185,717 | Roberts | June 6, 1916 |
| 1,459,358 | Buchenberg | June 19, 1923 |
| 1,956,041 | Naul | Apr. 24, 1934 |
| 2,392,097 | Meunier | Jan. 1, 1946 |
| 2,809,533 | Emrick | Oct. 15, 1957 |
| 2,836,073 | Masters | May 27, 1958 |